US012608287B2

(12) United States Patent
El-Batal et al.

(10) Patent No.: US 12,608,287 B2
(45) Date of Patent: Apr. 21, 2026

(54) MIGRATION OF DATA IN RESPONSE TO WRITE-FAILURE OF DISK DRIVE HEAD

(71) Applicant: Seagate Technology LLC, Fremont, CA (US)

(72) Inventors: Mohamad El-Batal, Superior, CO (US); Curtis Stevens, Irvine, CA (US); David Allen, Monument, CO (US); Jon D. Trantham, Chanhassen, MN (US); Ian Robert Davies, Longmont, CO (US); Mark A. Gaertner, Fort Myers, FL (US)

(73) Assignee: Seagate Technology LLC, Fremont, CA (US)

( * ) Notice: Subject to any disclaimer, the term of this patent is extended or adjusted under 35 U.S.C. 154(b) by 35 days.

(21) Appl. No.: 18/671,609

(22) Filed: May 22, 2024

(65) Prior Publication Data

US 2024/0394154 A1    Nov. 28, 2024

Related U.S. Application Data

(60) Provisional application No. 63/469,079, filed on May 26, 2023.

(51) Int. Cl.
G06F 11/00        (2006.01)
G06F 11/07        (2006.01)
G06F 11/16        (2006.01)

(52) U.S. Cl.
CPC ...... G06F 11/1658 (2013.01); G06F 11/0793 (2013.01)

(58) Field of Classification Search
CPC . G11B 20/18; G11B 20/1883; G11B 20/1889; G11B 2020/1893; G06F 11/0793; G06F 11/1658; G06F 11/1666; G06F 11/1446; G06F 11/1456; G06F 3/0676; G06F 3/0689; G06F 3/0647; G06F 3/0619; G06F 3/0617
See application file for complete search history.

(56) References Cited

U.S. PATENT DOCUMENTS

| | | | | |
|---|---|---|---|---|
| 7,472,223 B1 * | 12/2008 | Ofer | ................... | G11B 20/1883 |
| | | | | 714/6.32 |
| 7,526,684 B2 | 4/2009 | Bicknell | | |
| 7,587,631 B2 | 9/2009 | Shimmitsu | | |
| 7,752,491 B1 * | 7/2010 | Liikanen | ............ | G11B 20/1883 |
| | | | | 714/6.13 |
| 8,049,980 B1 | 11/2011 | Emami | | |
| 9,218,849 B1 * | 12/2015 | Trantham | ............... | G11B 27/36 |
| 11,430,471 B1 | 8/2022 | Cheney | | |
| 12,222,811 B2 * | 2/2025 | Allen | .................... | G06F 3/0638 |
| 2024/0329853 A1 * | 10/2024 | Cosby | ................... | G06F 3/0617 |

* cited by examiner

*Primary Examiner* — Marc Duncan
(74) *Attorney, Agent, or Firm* — Mueting Raasch Group

(57)        ABSTRACT
A failure of a head is detected, the head reading from and writing to an affected surface of a disk of a disk drive. The failure prevents the head from writing to the affected surface but does not prevent the head from reading from the affected surface. In response to detecting the failure, a remediation is performed. The remediation involves determining spare capacity blocks on other surfaces of the disk drive different than the affected surface, and copying data from the affected surface to the spare capacity blocks via an internal copy function within the disk drive. The spare capacity blocks in place of the affected surface for data storage and retrieval subsequent to the failure.

13 Claims, 6 Drawing Sheets

MIGRATION OF DATA IN RESPONSE TO WRITE-FAILURE OF DISK DRIVE HEAD

CROSS REFERENCE TO RELATED APPLICATIONS

This application claims the benefit of U.S. Provisional Application 63/469,079, filed May 26, 2023, the disclosure of which is incorporated by reference herein in its entirety.

SUMMARY

The present disclosure is directed to migration of data in response to write-failure of a disk drive head. In one embodiment, a failure of a head is detected. The head reads from and writes to an affected surface of a disk of a disk drive. The failure prevents the head from writing to the affected surface but does not prevent the head from reading from the affected surface. In response to detecting the failure, a remediation is performed. The remediation involves determining spare capacity blocks on other surfaces of the disk drive different than the affected surface and copying data from the affected surface to the spare capacity blocks via an internal copy function within the disk drive. The spare capacity blocks in place of the affected surface for data storage and retrieval subsequent to the failure.

In another embodiment, a failure of a head is detected, the head reading from and writing to an affected surface of a disk of a disk drive. The disk drive is part of a drive array, and the failure prevents the head from writing to the affected surface but does not prevent the head from reading from the affected surface. A remediation is performed that involves determining blocks of spare capacity of other drives of the drive array and copying data from the affected surface to the blocks of spare capacity of the other drives via a peer-to-peer data transfer within the array. The blocks of spare capacity are used in place of the affected surface for data storage and retrieval subsequent to the failure.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
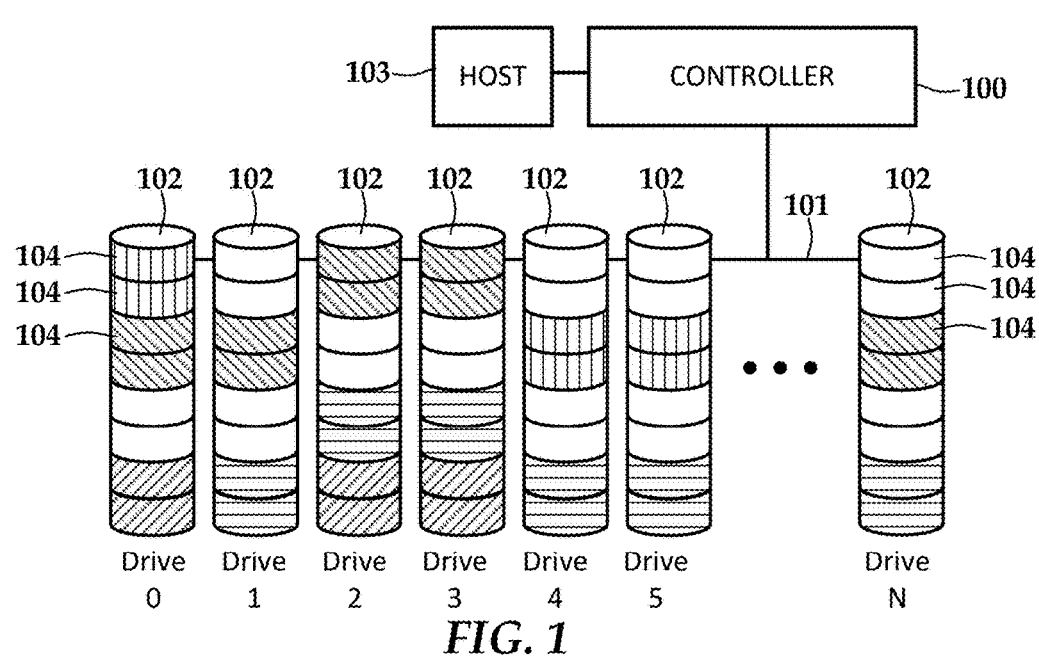
FIG. 1 is a diagram of a drive array according to an example embodiment.

The present disclosure is generally related to hard disk drives. While hard drives are not as prevalent in consumer applications due to inexpensive solid-state options, for large-scale data storage systems such as data centers, disk drives still make up a significant portion of total storage. Data centers may use faster tiers of storage (e.g., solid-state drives) for applications where fast random access and throughput is important. However, a large part of the data in a data center does not require this high-speed access, and so can be stored on disks which have a much lower cost per unit of storage.

The total cost of a drive array includes not only the cost of the drives, but operational costs, including the enclosures and racks that house the drives, and ongoing costs for electricity, cooling, etc. For example, increasing the individual drive capacity in an array from 10 TB to 20 TB, can provide a doubling of storage capacity without increasing operational costs, even the cost of the individual drives may roughly double. In order to increase capacity of the drives, higher areal density disk drive technologies are used, such as heat-assisted magnetic recording (HAMR). A HAMR drive can have significantly higher areal density than a conventional disk drive (e.g., perpendicular magnetic recording) and will be increasingly used in large data centers in order to reduce total cost per unit of storage.

A HAMR drive uses magnetic disks and read heads similar in many aspects as those used in conventional hard disk drives. The recording head on a HAMR drive is different in that it uses an energy source (e.g., a laser diode) to heat the recording medium as it is being recorded. This forms a small hotspot with lower magnetic coercivity compared to the region outside the hotspot. A magnetic field applied by the HAMR write head only changes magnetic orientation in the hotspot without affecting the surrounding region. This allows a HAMR drive to write significantly narrower tracks than a conventional drive.

Due to the added complexity of the HAMR energy source and its associated optical components (e.g., waveguides, near-field transducer, etc.), the writer of a HAMR read/write head may experience failures more often than conventional writers, and the writer also may experience failures more often than the reader on the same head. Therefore, it may be a regular occurrence where further data cannot be written to a surface of a disk after a writer failure, although data already written to the surface of the disk could still be read after the writer failure. Note that non-HAMR heads may also experience writer-only failures, and the embodiments described herein are not limited to HAMR drives.

In some existing systems, a failed writer could trigger a recovery option that treats the failed surface as unrecoverable, e.g., assumes that data cannot be read from the surface. In order to recover from drive failures, modern data storage systems (e.g., cloud storage) utilize parallelism and redundancy within an array of drive. For example, some form of RAID (redundant array of independent disks) is often used, wherein a plurality of disks are pooled together to form logical volumes. Each disk holds a part of the data (e.g., a chunk), and a subset of the chunks are set up to store redundancy data (e.g., parity). The storage controller assembles the chunks into RAID stripes, e.g., RAID Level 6 with eight data stripes of data and two parity stripes, sometimes annotated as RAID 6 (8+2). The addition of the parity data allows recreating data (also referred to as a parity-based rebuild) in the event of a failure of a disk on which either parity or data stripes are stored.

Conventional RAID can provide high reliability but can result in very long times to rebuild the array in the event of a failed drive. For example, in a RAID 8+2 volume that uses large drives (e.g., >14 TB), rebuilding the data of one failed drive can take a day or more. If a second drive in the volume fails, then this leaves a significantly long time window in which a third drive failure could lead to failure of the whole array. Further, the need to copy data between working drives of the RAID array affects array performance during recovery, as the significant I/O for the rebuild causes contention with ongoing end-user data access tasks.

One way to improve drive array performance when dealing drive failures involves using declustered parity instead of dedicated parity stripes. In a declustered parity scheme, the parity and data of chunks is spread across a large number of disks such that each disk has a combination of parity and data from different stripes. When a drive fails, the data and/or stripes can be rebuilt by reading data from many drives at once, thereby reducing the rebuild time. Generally, increasing the number of drives in a declustered parity array decreases the rebuild time as well as reducing impacts on operational performance during the rebuild.

Even within a declustered parity system, there is still a cost for rebuilding a failed drive. Therefore, it is desirable to reduce the need for a full rebuild in cases as described above, where a writer of a head fails but the reader on the same head still works. In embodiments described herein, a drive array has features that allow a drive with a write-failed head to continue to use an affected drive surface for reading data already written to the affected surface without immediately triggering a full rebuild of the surface or drive. Any further updates to the data on the affected surface can be cached and written elsewhere. The data stored on the impacted surface may be migrated elsewhere in such a way as to reduce impacts on array performance. For example, the data migration (also referred to herein as a "remediation") may be processed via a direct communications protocol (e.g., internal drive communications or external peer-to-peer communications) to reduce congestion of the storage input/output (I/O) busses used by rest of the array during regular operations (e.g., user-initiated storage and retrieval of data).

Because data centers often use tiered storage, disk storage is more likely to be used to store cold data (e.g., data that is written once and infrequently updated), whereas solid-state storage is more likely to be used for more frequently updated and accessed hot storage. Thus, in some embodiments below, the migration may occur gradually over time, e.g., where little or updating of data on the affected surface is expected.

In FIG. 1, a block diagram illustrates a storage array using a failure recovery scheme according to example embodiments. A set of drives 102 is shown that may be logically grouped together by one or more storage controllers 100. One or more hosts 103 are coupled to the controller and represents an end user of the storage array. The grouping of the drives 102 as shown in FIG. 1 may involve some sort of physical proximity, e.g., such that drives 102 are in the same case or rack, however this is not strictly required. For purposes of this example, it is assumed that at least some the drives 102 are coupled via a rack-level I/O backplane 101, e.g., using an NVMe backend fabric, Ethernet fabric, Serial Attached SCSI (SAS) switch, etc.

The I/O backplane 101 can use, in some embodiments, can use NVMeOF (Non-Volatile Memory Express over Fabrics) which facilitates transferring NVMe storage commands over a network medium such as Ethernet or Infini-Band. The I/O backplane 101 may use other rack-level networking technology such as SAS switches. An I/O backplane 101 with these types of network fabrics may allow many-to-many storage data paths. In some implementations, the use of a rack-level network fabric can increase storage access speed and reduce CPU overhead of servers. Technologies such as NVMeOF facilitate peer-to-peer (P2P) connections, which allows data transfer operations to flow directly between fabric interfaces (e.g., network interface chip) and NVMe endpoints, e.g., drives 102. This can reduce storage controller utilization (or host/server processor utilization) when performing drive-to-drive data transfers.

Generally, the controller 100 assembles separate partitions or stripes 104 within the drives into drive volumes. The drive volumes are treated by an end user (e.g., one or more host operating systems) as separate and independent drives for purposes of partitioning, formatting, filesystems, etc. The hatching of the stripes 104 shown in FIG. 1 indicates membership within a volume. For example, the vertical hatched stripes 104 at the top of Drive 0 form a volume with the vertical hatched stripes 104 near the middle of Drives 4 and 5. The unhatched stripes 104 indicate spare capacity. Within the stripes 104, data can be distributed in the form of equal-sized (e.g., 1 GB) chunks of user data (D), or parity (P and Q). For example, the number of drives (N) may be 52, with 16D+2P/Q or 8D+2P/Q stripes. The storage controller 100 may randomly disperse the data, parity, and spare capacity across 1 GB chunks on all drives 102.

Figure 2:
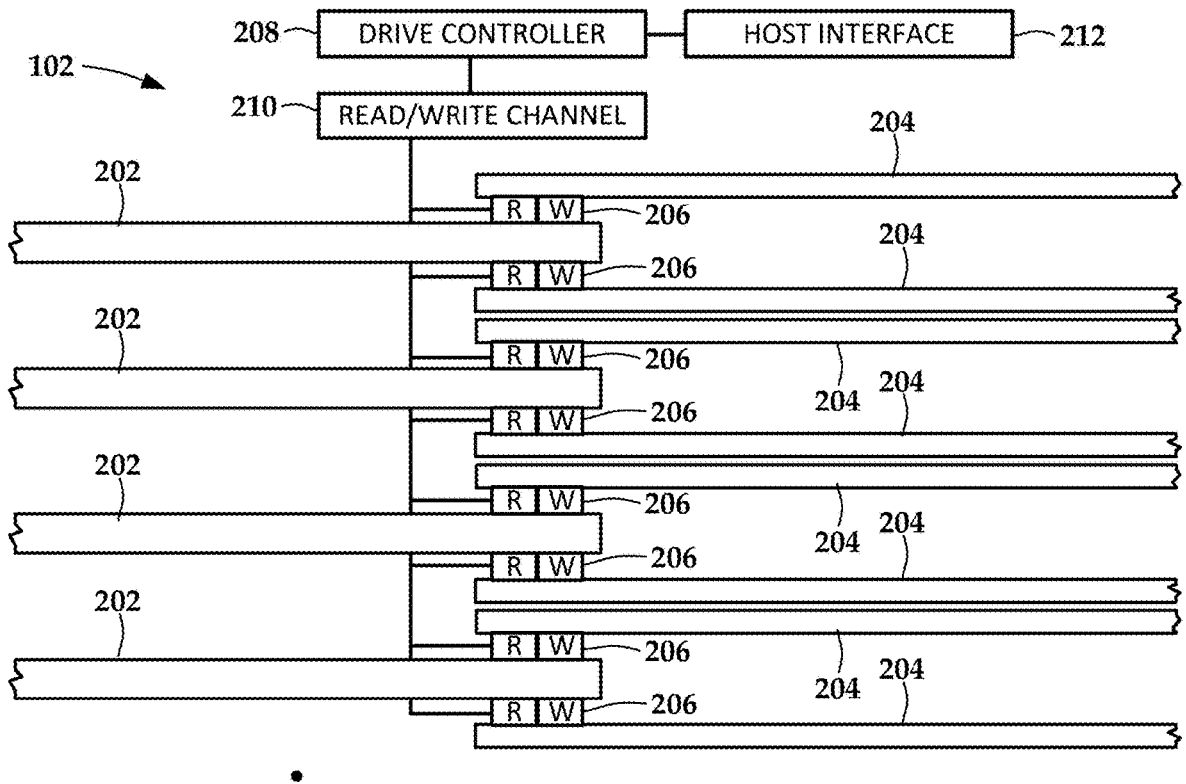
FIG. 2 is diagram of a disk drive according to example embodiments.

In FIG. 2, a diagram shows a disk drive 102 according to an example embodiment. The drive 102 includes platters 202 with opposed surfaces, each surface associated with an arm 204 and read/write head 206. The disk drive 102 includes one or more drive controllers 208 (sometimes referred to as system controller, embedded controller, etc.) coupled to a host interface 212. The host interface 212 allows for external communications with a storage controller 100 or the like. The disk drive 102 includes a read/write channel 210 that couples the drive controller 208 to the read/write head 206, allowing data to be read from and written to the platters 202. The read/write channels 210 also allow other communications with the read/write head 206, such as applying configurations to the heads and reading from head-integrated sensors.

Each read/write head 206 has at least one read transducer and at least one write transducer, indicated in the figures by the respective designations "R" and "W." Note that while the read transducers and write transducers are commonly integrated into a single head 206, other configurations may be possible, e.g., separately formed heads with different types of transducers. Also, the arms 204 are often joined together and moved by a single actuator, e.g., a voice coil motor (VCM). However, in some embodiments, two or more actuators may be used that drive different subsets of the arms 204.

Large capacity hard drives may have up to 10 disk platters 202, therefore would have up to 20 recording surfaces. In that configuration, there would be up to 20 heads 206 per drive 102, one head 206 per disk surface. For a 10-disk hard drive, a failure of one head would result in loss of around 5% of disk storage capacity. However, if this failure was a writer-only failure, in which the reader continues to operate, then this failure may not lead to a loss of data. A writer-only fail only limits the ability to store new data on the affected disk surface and limits the ability to update the existing data on the affected disk surface. However, assuming the disk surface and reader is not damaged, the drive may still be able to read already written data from the surface.

Because a writer-only failure does not lead to loss of data, it can be dealt with using a process that is less disruptive than a parity-based rebuild. Generally, a parity-based rebuild involves finding a target storage space that is at least as large as the lost storage space (which may be a single surface or an entire drive), accessing redundancy data that includes data and/or parity stripes (D+P/Q) that are accessible elsewhere on the array, and reconstructing the data using a mathematical combination of the redundancy data. In cases where the redundancy data is spread across the array, this will involve drive-to-drive transfers between multiple devices.

In contrast, when a writer-only failure occurs, the immediate concern is mostly to capture any updates to data or new data targeted for the failed head, e.g., keep track of any pending missed-writes to the impacted surface. The pending update data can be saved in a write-cache and/or unused spare drive space. The drive could continue using the data stored on the disk surface associated with the write-failed head (referred to herein as the "unwritable surface") indefinitely, so long as it is not too cumbersome to manage post-failure updates to the already written data. However, to avoid fragmentation of data, the drive 102 (and/or controller 100 and/or host 103) may migrate the data from the unwritable surface to spare storage elsewhere, which may be within and/or outside the hard drive.

Figure 3:
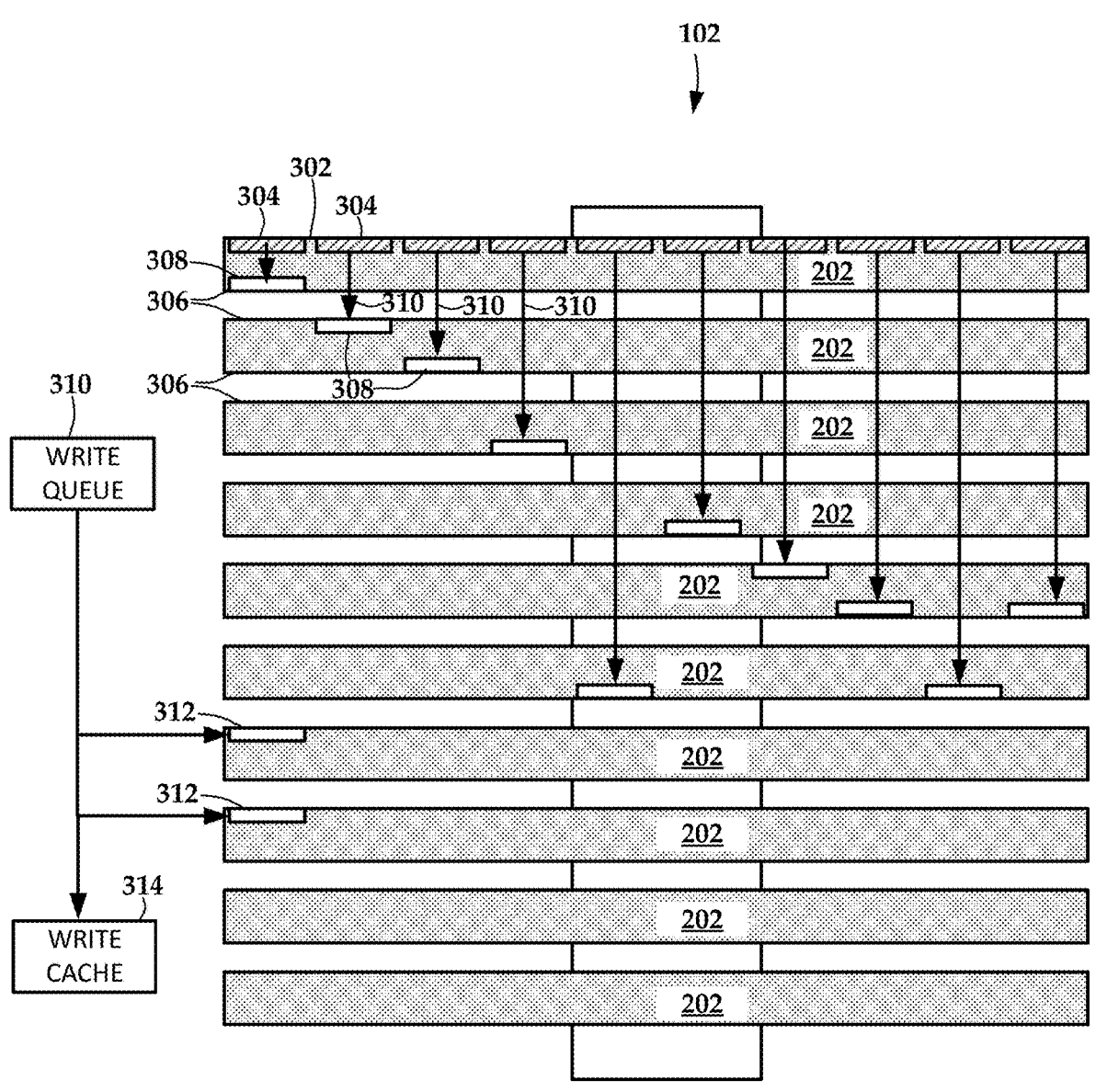
FIGS. 3 and 4 are block diagrams of a data migration from an unwritable surface according to example embodiments.

In FIG. 3, a block diagram shows an example of how data from an unwritable surface 302 of a disk drive 102 can be migrated according to an example embodiment. A head (not shown, see FIG. 2) has previously written data blocks 304 to the surface 302 of the top disk 202. The head experiences a write transducer failure, such that the blocks 304 will be migrated elsewhere within the drive 102 as time and/or space permits. Before the migration is completed, the disk drive 102 will also need to deal with any updates or new data directed to the surface 302, and that will be discussed in detail further below.

In the description below, the drive 102 is described as performing certain remedial actions in response to a failed writer. In some cases, the drive 102 may be able to undertake some actions independently of the controller 100 and/or host 103 as shown in FIG. 1. Nonetheless, the drive 102 will at least communicate some information regarding the failure and remediation to the controller 100 and/or host 103, e.g., using Self-Monitoring, Analysis and Reporting (SMART) communications. Such communications may include the nature of the failure (e.g., head 0 write fail), the affected physical or logical addresses, the type and substance of internally triggered remediation performed, etc. In other cases, some or all of the actions described below may be initiated, controller, monitored, and logged by the controller 100 and/or host 103.

Before migration begins in one embodiment, the drive 102 identifies blocks 308 that are pre-allocated spares within the drive, meaning that they are not currently allocated to any active stripes within a drive array. The spare blocks 308 may have never been written to or may have been previously used but had been converted to a spare, e.g., deletion of a volume associated with the spare blocks 308. The spare blocks 308 are located on surfaces 306 that are different than the unwritable surface 302.

In one embodiment, the drive 102 will migrate all data from the unwritable surface 302 to spare blocks 308 regardless of the amount of user data stored on the surface 302. Oftentimes, hard disk drives will have no knowledge of what addresses associated with surface 302 are currently being used to actively store data. That knowledge is often maintained by the host filesystem, and not the drives 102 or drive controller 100. While the drive 102 in such an arrangement will receive commands to write to particular addresses on the surface 302, the drive 102 typically won't keep records of such events. Even if the drive did keep a record of previously written addresses, the drive may have no knowledge of deletion of data, as deletions are typically not communicated to a hard disk drive. However, drive interface commands such as TRIM, which were originally intended for SSDs, will communicate to drives that portions are deleted and HDDs could be adapted to use TRIM commands. Nonetheless, if the drive 102 is performing an internally initiated migration (e.g., without explicit instructions from the storage controller or host) it may just migrate all data from the unwritable surface 302 without consideration as to what part of the surface 302 does or does not store in-use, user data.

Even if the drive cannot internally determine which blocks 304 have user data, the host and/or storage controller may be able to communicate that information to the drive 102, or actively guide the internal data migration. In such a case, the minimum capacity of the spare blocks 308 may only need to be equal to the total amount of data already stored on the unwritable surface 302. For example, if surface 302 had 1 TB of storage capacity but was 10% full when write failure occurred, then the total size of the blocks 304 is 100 GB and the spare blocks 308 allocated for the migration may only need to be 100 GB, although spare blocks 308 may be overprovisioned by some amount, e.g., to account for possible updates or new data written data during migration.

Upon detection of the write-failure, the spare blocks 308 are designated to receive the data from blocks 304 of the unwritable surface 302, after which data is selectively and/or collectively copied 310. Copying 310 of data from blocks 304 to blocks 308 may occur under the direction of a host and/or storage controller (e.g., host 103 and storage controller 100 in FIG. 1), which can initiate a special fast-rebuild that reads the data blocks 304 from the impacted surface then writes it to spare blocks 308 within the same drive 102. For example, the host and/or storage controller can provide the drive 102 an ordered pair of to-from locations (e.g., defined as block, sectors, cylinders, etc.) and the drive 102 will perform the migration internally, and may only need to communicate to the host and/or storage controller when the operation is complete and/or any errors encountered.

In one embodiment, copying 310 of data from blocks 304 to blocks 308 may occur using a hard disk drive (HDD) internal copy function, e.g., to copy the list of impacted logical block addresses (LBAs) of blocks 304 to the list of LBAs of spare blocks 308. This will avoid congestion on the I/O network that couples disks of the array, e.g., backplane with NVMe backend fabric. In some embodiments, the drive 102 may schedule the copying 310 from blocks 304 to blocks 308 using low priority reads and writes, e.g., to reduce the impact on host-initiated data read and write commands that occur in parallel with the migration.

If the data in blocks 304 is part of cold storage (e.g., archived data that is unlikely to be updated) there may be no need to move the data from the unwritable surface 302, at least until some write activity is directed to the LBAs of the blocks. In such a case, the copying 310 may be triggered only when data within a block 304 is changed. Once triggered, the copying may only involve copying the affected block 304 if an update occurs, or allocating a spare block for newly written data to the affected surface. In this arrangement, the spare blocks 308 may be dynamically allocated on an as-needed basis to keep spare capacity open for other uses, such as rebuilds in response to full drive failures.

Once the write-failure is detected and remediation begins, the disk drive 102 may still receive incoming write requests from a host targeted for the unwritable surface 302. In FIG. 3, a write queue 311 is shown that holds incoming write commands to the disk drive 102. Any write commands that target an LBA of the unwritable surface may be written to a non-volatile storage, such as spare disk blocks 312 and/or a non-volatile write cache 314 (e.g., flash memory cache). The cached write data may be used for subsequently updating the data in spare blocks 308 after data remediation is complete, and to service read requests before remediation is complete.

As noted above for one or more embodiments, a delayed migration may involve triggering the migration of a particular block 304 to a spare block 308 only upon the receipt of a write command targeted to an LBA of the block 304. After or during the migration, the newly received write command can be applied. In this way, blocks 304 may not get migrated for a while, if ever, after the writer failure, depending on write activity directed to the blocks 304.

In one embodiment, the affected blocks 304 may not be migrated at all after a writer failure, even if new writes or updates are directed to the blocks 304. Any changes to data in the blocks 304 can be handled by remapping of the LBAs of updated blocks to physical addresses (e.g., sector identifiers) in the spare blocks 308 or 312, while keeping the existing logical-to-physical mapping for unchanged data on the unwritable surface 302. This would reduce the amount of spare storage capacity used to deal with the failed surface at the expense of fragmenting the logical-to-physical address mapping (e.g., contiguous range of LBAs is mapped to a discontinuous range of physical addresses). Once this fragmentation reaches a certain threshold, then the entire set of data associated with the block may be migrated into a spare block 308 such that the LBA range of the original block 304 is assigned a contiguous physical address range on another disk surface 306.

Figure 4:
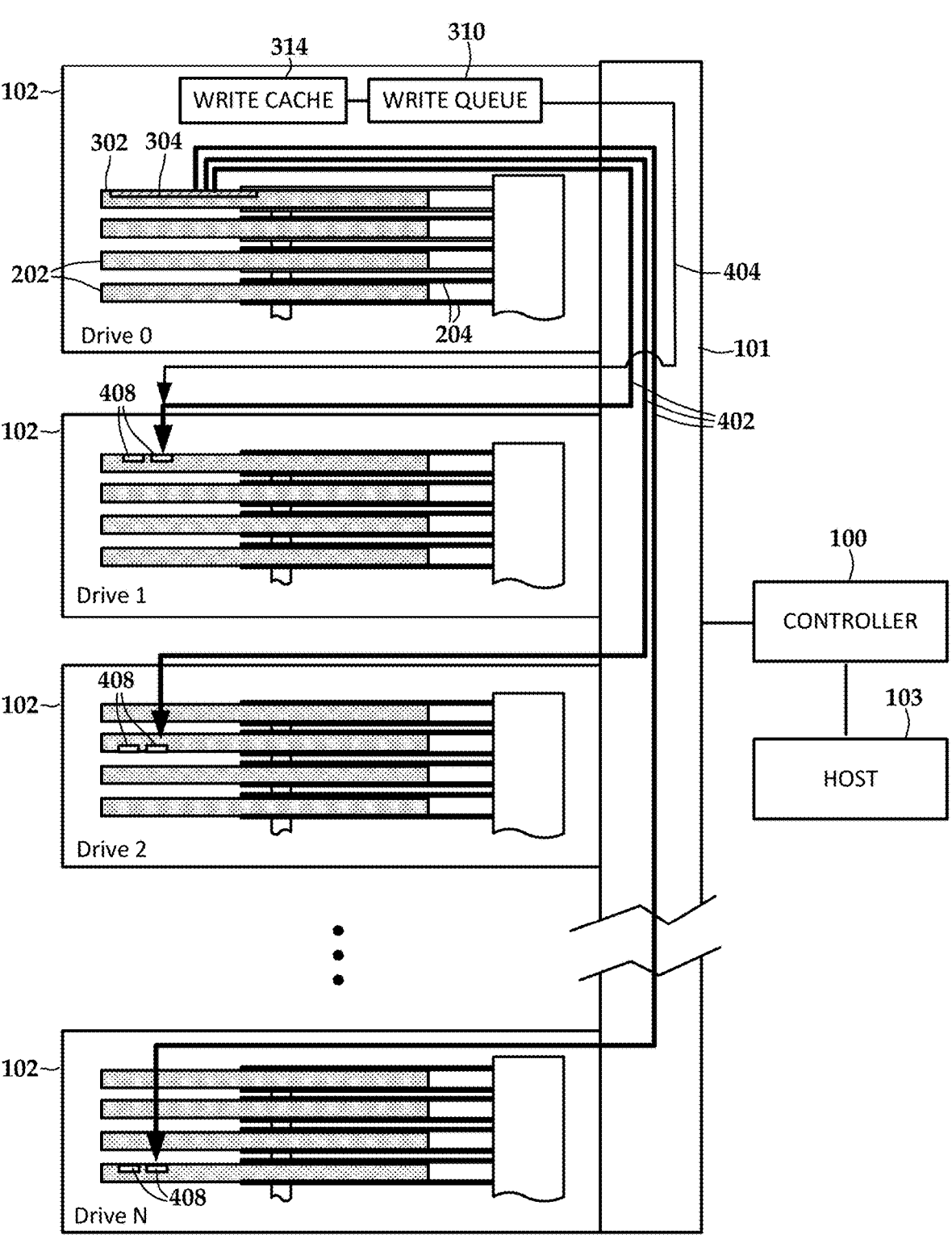

In some cases, the drive 102 may not have enough spare capacity to store the data blocks 304 from unwritable surface 302. Or the drive 102 may have enough spare capacity, but a system policy requires a certain amount of overprovisioning for other purposes (e.g., rebuilding of failed volumes) and storing of data blocks 304 would violate this policy. Therefore, the drive 102 may migrate the data blocks 304 to other drives coupled to the same backplane, or other remotely accessible drive, e.g., via a storage area network (SAN). In FIG. 4, a block diagram shows how inter-drive migration can be performed via a rack-level storage fabric while minimizing impacts to the drive array as a whole.

In FIG. 4, the top drive 102 (Drive 0) has an unwritable surface 302 and as a result will migrate at least some data blocks 304 to other drives 102 coupled to the backplane 101. As indicated by peer-to-peer data transfer paths 402, the data of blocks 304 is copied to external blocks 408 of the other drives via the backplane 101 using a protocol such as NVME P2P. The drives 102 may be able to perform the majority of the P2P data transfer work without intervention of the storage controller 100 and/host 103, although the controller 100 and/host 103 may dictate some aspects of the data transfer, e.g., assigning target drives 102 and LBAs of spare data blocks 408 within the target drives (e.g., Drives 1, 2, and N) to receive the data, and communicating this to the failure-affected drive (Drive 0). This data transfer may be managed similar to the inter-drive transfer described above, e.g., all data of surface 302 is copied once the surface 302 is unwritable, gradual copy of data to reduce impact, copy on block update, copy once fragmentation threshold is reached, copy only blocks with stored user data, etc. Further, the controller 100 and/or host 103 may initiate the P2P transfers but be otherwise uninvolved except to receive a status of the transfer operation once successfully completed or if failed.

The failure-affected drive (Drive 0) is also shown with a write queue 311 and write cache 314 as previously described in relation to FIG. 3. The new data and updates targeted for the unwritable surface 302 may be handled similarly as described above, except that updates to migrated data may occur via the backplane 101, as indicated by data path 404. In some embodiments, the storage controller 100 and/or host 103 may manage the write queuing and caching independently of the failure-affected drive 102, e.g., intercepting any write requests targeted for the unwritable surface 302 and caching them in a designated location, e.g., failure-affected drive 102, other drives 102, on non-volatile memory of the controller 100, etc. The write-update data path 404 may utilize a P2P protocol as described before or may use a non-P2P protocol.

Figure 5:
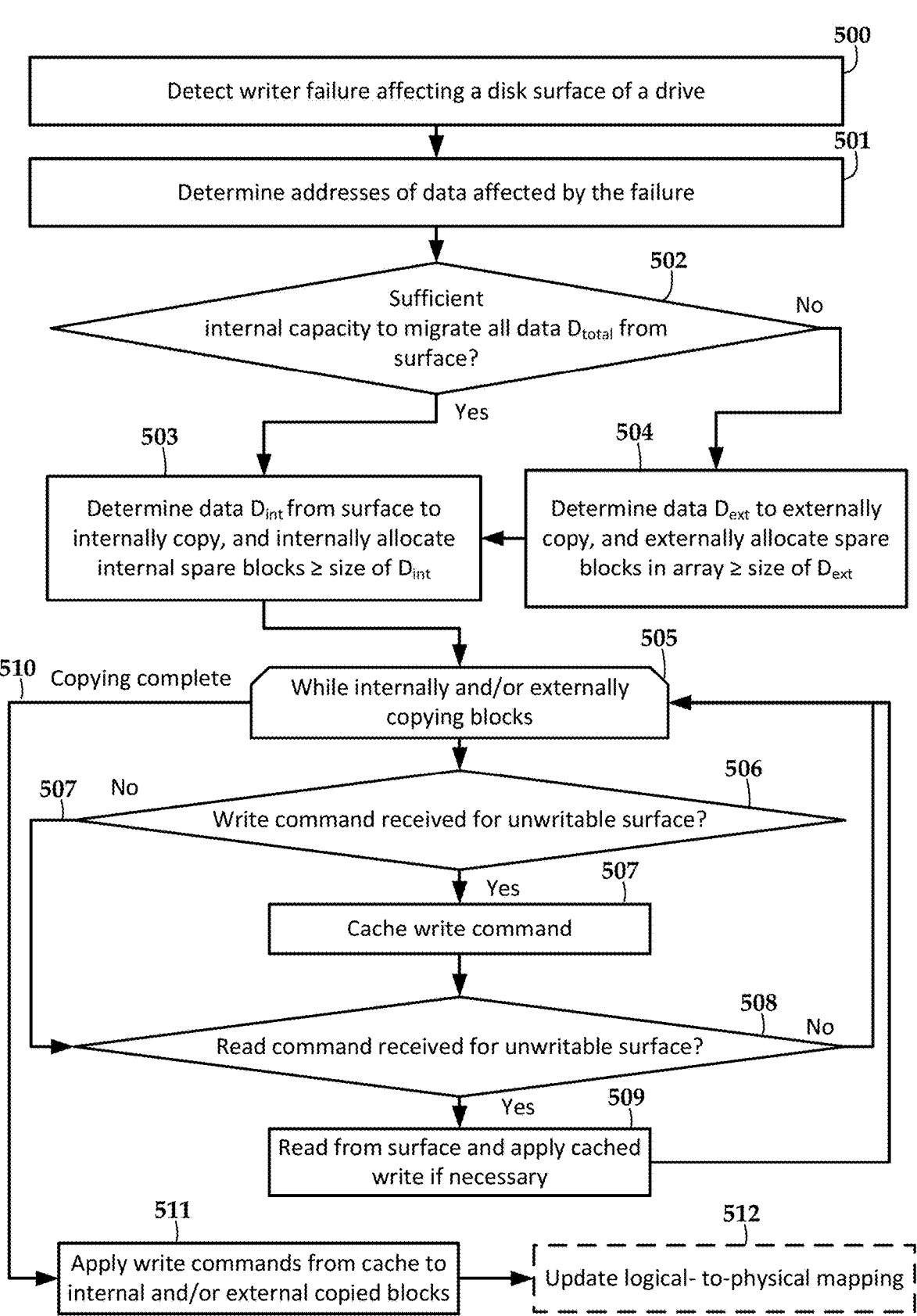
FIGS. 5 and 6 are flowcharts of methods according to example embodiments.

Note that a drive 102 may use any combination of the on-drive and off-drive migration as shown in FIGS. 3 and 4. An example of this is shown in FIG. 5, which is a flowchart of a method according to an example embodiment. The method involves detecting 500 a writer failure affecting a disk surface of a drive. The detection 500 may be triggered by a failed write-verify or readback attempt, and/or may result from a direct sensor measurement from a head that encompasses the writer. For example, a laser current could be out of range in response to an applied voltage, no illumination or heat is detected via a light or heat sensor when the laser is activated, etc. This could also or instead involve non-HAMR-specific failures, e.g., a failed write coil. In response to detecting 500 the writer failure, the drive determines 501 address ranges (e.g., LBA range) of data affected by the failure. The addresses may include all addresses mapped to the disk surface, or only those addresses where data has already been written to the disk surface, should that information be made available to the drive and/or drive controller.

The address ranges determined at block 501 can be used to both plan out the data migration from the unwritable surface as well as determine if any incoming write requests are directed to the unwritable surface. In block 502, the drive determines if it has sufficient spare capacity on the other writable surfaces internal to the drive. If so, it allocates 503 that spare space to the migration. If the drive determines at block 502 that it has insufficient internal spare capacity, then it assigns some or all of the data for external copy at block 504.

Block 505 represents a loop in which the external and/or internal copying of data from the unwritable surface is being performed. While in the loop, the controller checks at block 506 if any write commands are received targeted for the unwritable surface. If so, the write command is cached 507 using a write cache or some other non-volatile storage. The controller also checks at block 508 to see if read commands are received for the unwritable surface. If so, at block 509, the read command is serviced by reading from the unwritable surface and, if necessary, an update from the write cache is applied to data returned in response to the read command.

Once all data is copied to the spare blocks, block 505 exits via path 510. At this stage, all of the data one the spare blocks should be at the state just before the writer failure occurred. Therefore, as shown at block 511, any write commands that were cached in the interim will be applied to the copied blocks. Also, as indicated by block 512, there may optionally be remapping of logical to physical addresses, e.g., if the drive is using internally available spare capacity without changing LBAs associated with the unwritable surface.

Figure 6:
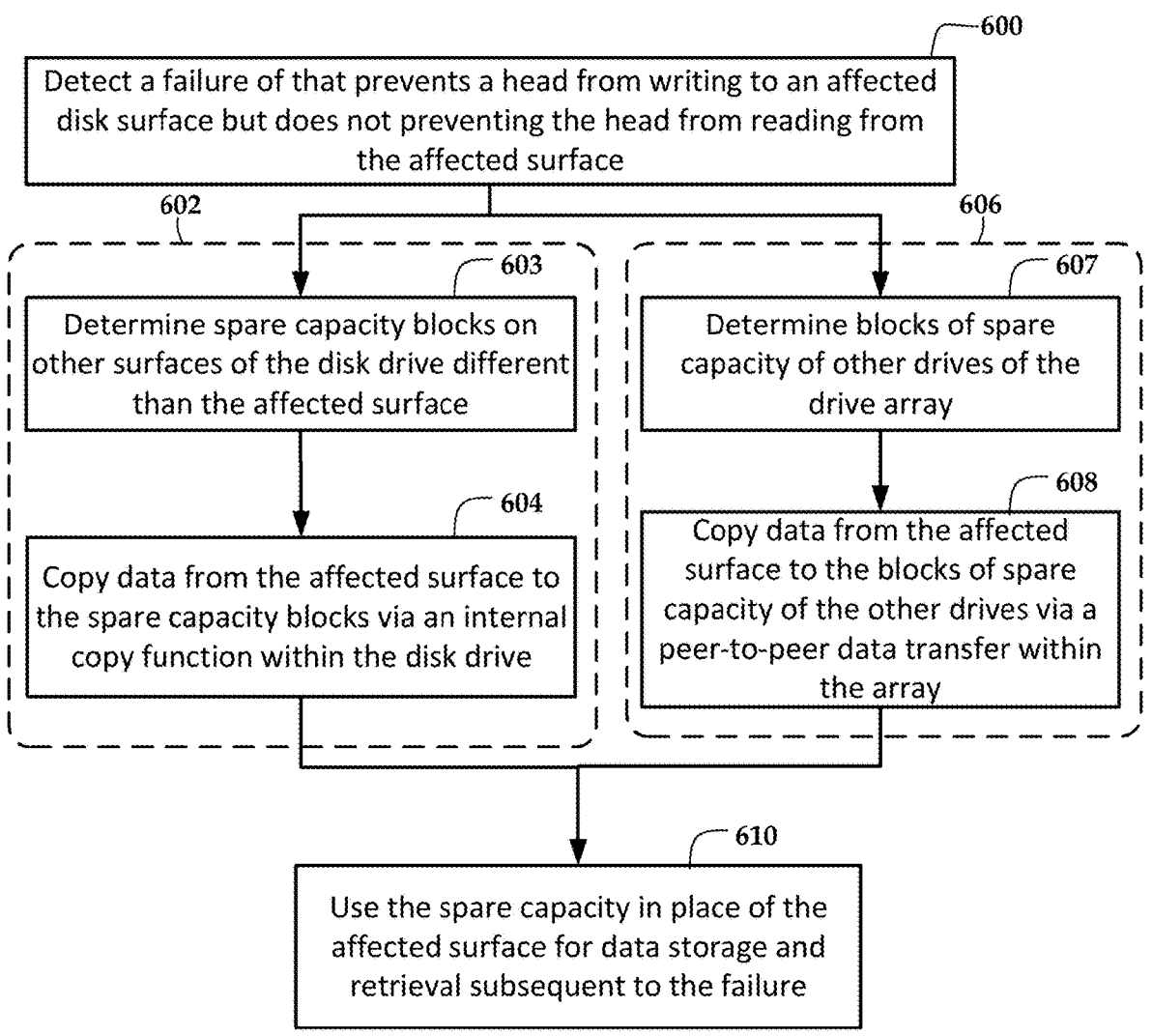

In FIG. 6, a flowchart shows a method according to another example embodiment. The method involves detecting 600 a failure of a head that reads from and writes to an affected surface of a disk of a disk drive. The failure prevents the head from writing to an affected disk surface but does not preventing the head from reading from the affected surface. In response to detecting the failure, at least one remediation 602, 606 is performed. The first remediation 602 involves determining 603 spare capacity blocks on other surfaces of the disk drive different than the affected surface and copying 604 data from the affected surface to the spare capacity blocks via an internal copy function within the disk drive. The second remediation 606 involves determining 607 blocks of spare capacity of other drives of the drive array and copying 608 data from the affected surface to the blocks of spare capacity of the other drives via a peer-to-peer data transfer within the array. After the at least one remediation process 602, 606 is complete, the spare capacity is used 610 in place of the affected surface for data storage and retrieval subsequent to the failure.

If both remediations 602, 606 are performed, they may be performed in series or in parallel. Note that the copying steps 604, 608 can be done independently of a storage controller or host, even if the storage controller or host initiates the copy and checks on completion status. The copying 604, 608 may involve steps such as write validation, transmission error checking, etc., that can be handled internally within the drive for step 604 or between two drives for step 608, without the host or storage controller being involved.

Note that internal remediation 602 can be used regardless whether the disk drive is used in an array, while external remediation 606 is used within an array that supports peer-to-peer data transfer protocols. The external remediation 606 is likely performed in coordination with a storage controller and/or host (e.g., controller and/or host sets certain parameters such as endpoints for data copying and initiates copy), and internal remediation 602 may also be coordinated by controller and/or host but may also be internally triggered and completed in some cases. In both remediations 602, 606, write commands directed to the affected surface will be cached while the remediations 602, 606 are in progress. The cached writes can be used to update the migrated data after remediation, as well as update read requests while remediation is ongoing.

Figure 7:
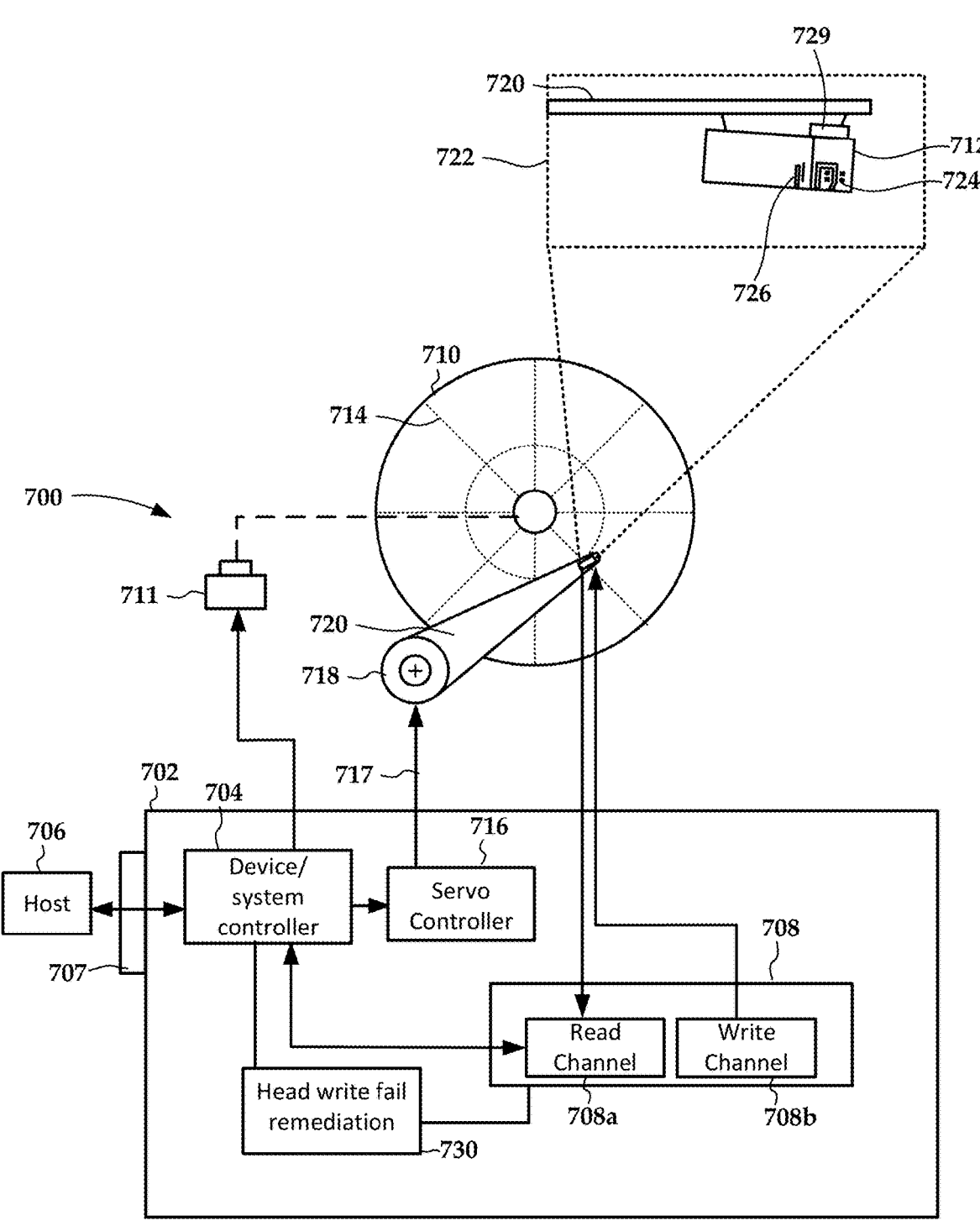
FIG. 7 is a block diagram of a data storage apparatus according to an example embodiment.

The remediation procedures described above can be implemented in any system that exhibits head failures such as hard drives. In FIG. 7 a block diagram shows a data storage apparatus 700 (e.g., HDD) according to an example embodiment. The apparatus 700 includes circuitry 702 such as one or more device/system controllers 704 that process read and write commands and associated data from a host device 706 via a host interface 707. The controllers 704 may include one or more processors that work cooperatively to perform the operations described herein.

The host interface 707 includes circuitry that enables electronic communications via standard bus protocols (e.g., SATA, SAS, PCI, NVMe, etc.). The host device 706 may include any electronic device that can be communicatively coupled to store and retrieve data from a data storage device, e.g., a computer, a server, a storage controller. The system controller 704 is coupled to one or more read/write channels 708 (shown here as separate read channel 708a and write channel 708b) that read from and write to a recording media, which in this figure are surfaces of one or more magnetic disks 710 that are rotated by a spindle motor 711.

The read/write channels 708 generally convert data between the digital signals processed by the device controller 704 and the analog signals conducted through a plurality of heads 712 during read and write operations. As seen in detail view 722, each head 712 may include one or more read transducers 726 each capable of reading one surface of the disk 710. The head 712 may also include respective write transducers 724 that concurrently write to the disk 710. The write transducers 724 may be configured to write using an energy source (e.g., laser 729 for a HAMR device), and may write in various track configurations, such as conventional tracks, shingled magnetic recording (SMR), and interlaced magnetic recording (IMR).

The read/write channels 708 may utilize analog and digital circuitry such as digital-to-analog converters (DACs), analog-to-digital converters (ADCs), detectors, decoders, timing-recovery units, error correction units, etc., and some of this functionality may be implemented in code executable code on the digital circuitry. The read/write channels 708 are coupled to the heads 712 via interface circuitry that may include preamplifiers, filters, etc. A separate read channel 708a and write channel 708b are shown, although both may share some common hardware, e.g., digital signal processing chip.

In addition to processing user data, the read channel 708a reads servo data from servo marks 714 on the magnetic disk 710 via the read/write heads 712. The servo data are sent to one or more servo controllers 716 that use the data (e.g., frequency burst patterns and track/sector identifiers embedded in servo marks) to provide position control signals 717 to one or more actuators, as represented by voice coil motors (VCMs) 718. In response to the control signals 717, the VCM 718 rotates an arm 720 upon which the read/write heads 712 are mounted. The position control signals 717 may also be sent to microactuators (not shown) that individually control each of the heads 712, e.g., causing small displacements at each read/write head.

One or more processors of the controller 704 are operable via a write fail remediation module 730 detect a write-failed head of the plurality of heads 712 associated with an affected one of the plurality of disk surfaces 710. The write-failed head is unable to write to the affected surface but is able to read from the affected surface. In response to detecting the write-failed head, the write fail remediation module 730 performs a remediation that involves: determining spare capacity blocks on other surfaces of the plurality of surfaces different than the affected surface; and copying data from the affected surface to the spare capacity blocks via an internal copy function within the disk drive 700. Subsequent to detecting the write-failed head, the disk drive 700 uses the spare capacity blocks in place of the affected surface for data storage and retrieval.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by one or more processors. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A method, comprising:

detecting a failure of a head that reads from and writes to an affected surface of a disk of a disk drive, the failure preventing the head from writing to the affected surface but not preventing the head from reading from the affected surface;

in response to detecting the failure, performing a remediation comprising:

determining spare capacity blocks on other surfaces of the disk drive different than the affected surface; and copying data from the affected surface to the spare capacity blocks via an internal copy function within the disk drive;

using the spare capacity blocks in place of the affected surface for data storage and retrieval subsequent to the failure;

caching write commands targeted for the affected surface, wherein the cached write commands are applied to the data of the spare capacity blocks after the remediation is complete; and servicing a read command targeted for the affected surface, an address of the read command having been modified by a selected one of the cached write commands, wherein the selected cached write command is applied to read request data returned in response to the read command.

2. The method of claim 1, wherein the disk drive is part of a drive array, wherein the remediation is performed in place of a parity-based rebuild of the affected disk surface via the array.

3. The method of claim 2, wherein the remediation is initiated by at least one of a storage controller and a host coupled to the drive array, wherein the copying of the data from the affected surface to the spare capacity blocks is internally performed by the disk drive.

4. The method of claim 3, wherein write commands targeted for the affected surface are cached via at least one of the storage controller and the host, wherein the cached write commands are applied to the data of the spare capacity blocks after the remediation is complete.

5. The method of claim 2, wherein the remediation further comprises:

determining that the spare capacity blocks have insufficient capacity to store all of the data from the affected surface;

identifying blocks of spare capacity of other drives of the drive array; and copying at least part of the data from the affected surface of the disk drive to the blocks of spare capacity of the other drives via a peer-to-peer data transfer within the array.

6. The method of claim 5, wherein the copying of the at least part of the data from the affected surface of the disk drive to the blocks of spare capacity of the other drives is initiated by at least one of a storage controller and a host coupled to the drive array, the peer-to-peer data transfer after the initiation being performed independently of the storage controller and the host.

7. A disk drive comprising one or more processors operable to perform the method of claim 1.

8. A method, comprising:

detecting a failure of a head that reads from and writes to an affected surface of a disk of a disk drive, the disk drive being part of a drive array, the failure preventing the head from writing to the affected surface but not preventing the head from reading from the affected surface;

performing a remediation initiated by at least one of a storage controller and a host coupled to the drive array, the remediation comprising:

determining blocks of spare capacity of other drives of the drive array; and copying data from the affected surface to the blocks of spare capacity of the other drives via a peer-to-peer data transfer within the array, the peer-to-peer data transfer performed independently of the storage controller and the host; and using the blocks of spare capacity in place of the affected surface for data storage and retrieval subsequent to the failure.

9. The method of claim 8, wherein the remediation is performed in place of a parity-based rebuild of the affected disk surface via the array.

10. The method of claim 8, wherein write commands targeted for the affected surface are cached via at least one of the storage controller and the host, wherein the cached write commands are applied to data of the blocks of spare capacity after the remediation is complete.

11. The method of claim 10, wherein the remediation further comprises servicing a read command targeted for the affected surface, an address of the read command having been modified by a selected one of the cached write commands, wherein the selected cached write command is applied to read request data returned in response to the read command.

12. A disk drive comprising one or more processors operable to perform the method of claim 8.

13. A system comprising a drive array that includes a disk drive, the disk drive comprising:

a read/write channel operable to communicate with a plurality of heads that read and write to a respective plurality of disk surfaces of the disk drive; and one or more processors coupled to the read/write channel and operable via instructions to perform:

detect a write-failed head of the plurality of heads associated with an affected one of the plurality of disk surfaces, the write-failed head unable to write to the affected surface but able to read from the affected surface;

in response to detecting the write-failed head, perform a remediation comprising:

determining spare capacity blocks on other surfaces of the plurality of surfaces different than the affected surface;

copying data from the affected surface to the spare
capacity blocks via an internal copy function within
the disk drive;

determining that the spare capacity blocks have insuf-
ficient capacity to store all of the data from the
affected surface;

in coordination with at least one of the storage con-
troller and the host, identifying blocks of spare
capacity of other drives of the drive array; and copying at least part of the data from the affected
surface of the disk drive to the blocks of spare
capacity of the other drives via a peer-to-peer data
transfer within the array, the copying initiated by at
least one of the storage controller and the host
coupled, wherein the peer-to-peer data transfer after
the initiation is performed independently of the stor-
age controller and the host; and use the spare capacity blocks in place of the affected
surface for data storage and retrieval subsequent to
detecting the write-failed head, the system further comprising a storage controller and a
host coupled to the drive array, wherein the copying of
the data from the affected surface to the spare capacity
blocks is internally performed by the disk drive.

* * * * *